(12) United States Patent
Shuster

(10) Patent No.: US 7,937,320 B2
(45) Date of Patent: May 3, 2011

(54) MANAGED PURCHASING ACCOUNT FOR DEFINED COMMODITIES

(75) Inventor: Gary Stephen Shuster, Fresno, CA (US)

(73) Assignee: Hoshiko, LLC, Henderson, NV (US)

( * ) Notice: Subject to any disclaimer, the term of this patent is extended or adjusted under 35 U.S.C. 154(b) by 171 days.

(21) Appl. No.: 11/559,532

(22) Filed: Nov. 14, 2006

(65) Prior Publication Data
US 2007/0108275 A1 May 17, 2007

Related U.S. Application Data

(60) Provisional application No. 60/736,968, filed on Nov. 14, 2005.

(51) Int. Cl.
*G06Q 40/00* (2006.01)
(52) U.S. Cl. .............................. 705/39; 705/35; 705/42
(58) Field of Classification Search .................. 705/35, 705/39, 44, 36
See application file for complete search history.

(56) References Cited

U.S. PATENT DOCUMENTS

| 2002/0174030 | A1* | 11/2002 | Praisner et al. ................. 705/26 |
| 2003/0048893 | A1* | 3/2003 | McIllwaine et al. ..... 379/265.06 |
| 2003/0105711 | A1* | 6/2003 | O'Neil ............................ 705/39 |
| 2004/0249752 | A1* | 12/2004 | Prato et al. ..................... 705/41 |
| 2005/0187842 | A1* | 8/2005 | Grear et al. .................... 705/35 |
| 2005/0205662 | A1* | 9/2005 | Nelson .......................... 235/380 |

* cited by examiner

*Primary Examiner* — Jagdish N Patel
*Assistant Examiner* — Kevin Poe
(74) *Attorney, Agent, or Firm* — Knobbe Martens Olson & Bear, LLP

(57) ABSTRACT

A purchase account may be managed to control purchases made using the account. An account number may be provided at a point of sale. The account number is associated with or includes an identifier for a class or type of goods or services. A merchant computer may receive the identifier and process it to determine whether what is proposed for purchase using the account is a qualified type of good or service. The computer may obtain a list of qualified or unqualified products and compare the list to what is proposed for purchase. In the alternative, the computer may provide instructions to a human operator for the merchant, who may determine whether or not the proposed product is qualified. If the proposed product is deemed qualified for purchase, use of the account may be approved; if otherwise, use of the account may be refused.

20 Claims, 2 Drawing Sheets

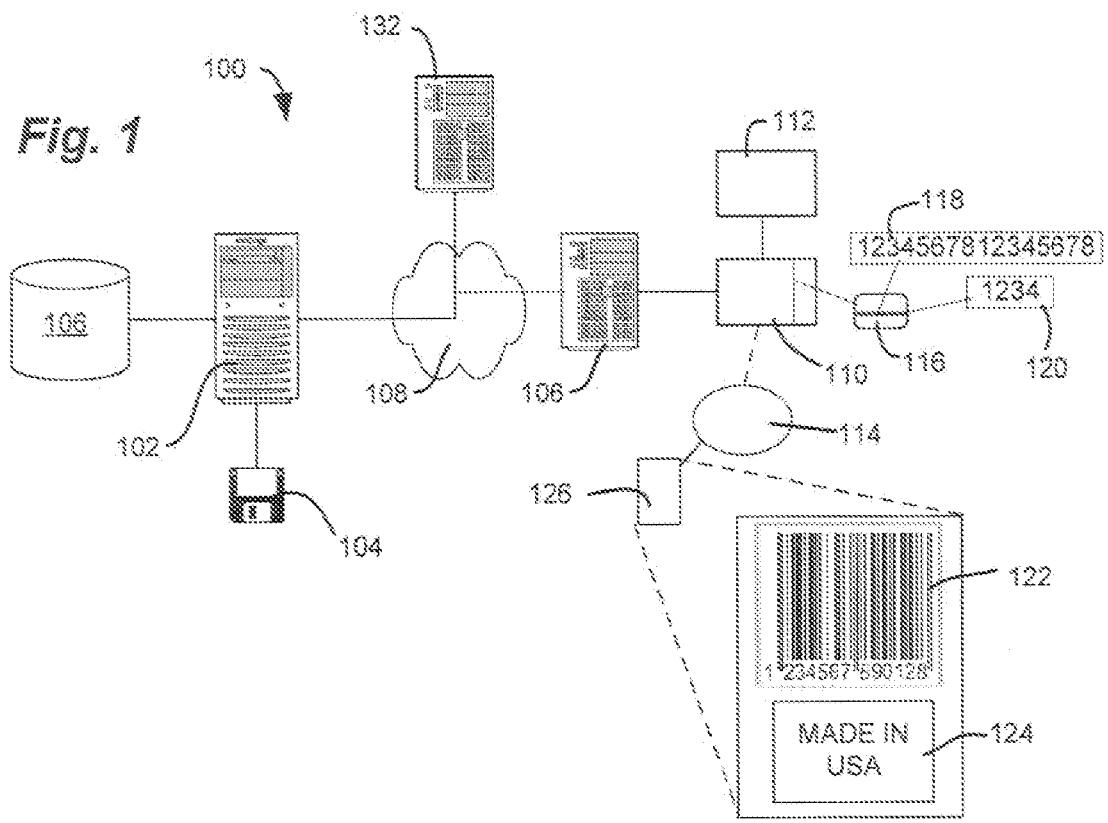

MANAGED PURCHASING ACCOUNT FOR DEFINED COMMODITIES

CROSS-REFERENCE TO RELATED APPLICATION

This application claims priority pursuant to 35 U.S.C. §119(e) to U.S. provisional application Ser. No. 60/736,968, filed Nov. 14, 1005, which application is specifically incorporated herein, in its entirety, by reference.

BACKGROUND

1. Field of the Inventions

Embodiments of the present invention relate to managing purchases made using a debit or credit account.

2. Description of Related Art

"Purchase account" is a generic term for accounts that can be used for purchasing from different merchants, for example, accounts such as are commonly associated with credit and debit cards. A credit card is issued by a bank or other financial institution, and can be used by the bearer to purchase generally unrestricted goods up to a defined credit limit. The issuer tracks expenditures charged by the bearer and periodically sends an invoice to the bearer for the amount of credit used, which must be repaid. A debit card may also be issued by a bank or other financial institution, and can be used to purchase generally unrestricted goods up to an amount of money, which may be fixed or replenishable, residing in an account associated with the debit card. When the account is depleted, the debit card cannot be used to purchase anything.

One increasingly-popular example of a debit purchase card is a "gift" card. A gift card is essentially a debit card associated with a fixed account, usually one that cannot be replenished. People often give a branded gift card, such as a gift card issued by a bank, credit company, or merchant, with a defined amount of money "loaded" onto the card, in lieu of cash as a gift. Merchants often promote the purchase of gift cards redeemable only at the merchant selling the cards.

Limitations of the use of purchase cards or accounts generally consist of credit or account limits, and/or restrictions to use at specific merchants. While it is possible to purchase a gift card redeemable at a single merchant or group of merchants, there is no way to give a gift card that can be utilized at any store of the recipient's choosing, while still being limited as to the type of merchandise that may be purchased using the card. For example, it may be desirable to give a child a gift card that may be used for children's books at any vendor, but not for other merchandise carried by the same vendors. For further example, it may be desirable to give a gift card for goods certified as meeting any of a variety of standards, for example, "Made in America," "Free of Animal Products," "Environmentally Friendly," "Organically Grown," "Family Friendly," "Child Safe," or any of a plethora of other standards that may reflect the values or concerns of the person purchasing the gift card. It is desirable that the person receiving such gift cards should not be limited to shopping with a single merchant or small collection of merchants, but may use the card to purchase the approved category of goods from any merchant who accepts credit or debit cards. Presently, no system exists for providing this capability with gift cards or other types of cards or purchasing accounts.

The same limitation is true of corporate cards or accounts intended for only certain purchases. For example, it may be desirable to provide an employee with a corporate card that can only be used to purchase supplies of a certain type, for example, office supplies, or wholesale goods related to a retail business of the providing company, while still allowing employees holding such cards to buy from any seller that accepts credit or debit cards. Currently, if an employee intentionally or accidentally misuses a card, this may not be discovered in time to undo the damage caused.

It would be desirable, therefore, to provide a tool whereby providers of purchase accounts can better control how the account is used.

SUMMARY

A method and system are provided whereby a purchase account may only be redeemed for commodities of a predefined type. As used herein, a "commodity" is simply any good or service offered as a product for sale on the market, and "commodities" are the plural of commodity used in this sense.

The purchase account may be used with unrestricted merchants, or in an alternative embodiment, may limit the account user to a particular merchant or merchants. Account information may be encoded on a card such as may be conveniently sized for carrying in a wallet or purse. While use of purchase "cards" is generally described herein, it should be appreciated that the examples and embodiments illustrated for cards may readily be adapted for any other article bearing account information for a purchase account, whether in written form or encoded as data in a magnetic, optical, or electronic medium or device. Cards are commonly used and convenient articles for storing account information, but any other suitable article may be used as well. While the embodiments disclosed herein may be useful for gift cards, the embodiments may also be useful for other debit or credit cards, or any other type of purchase account used to purchase goods or services, whether or not account information is encoded on a card or other article.

In an embodiment of the method, a backend database of identifiers for designated goods is provided at a central server, in association with a purchase card or account. The designated goods may either be goods qualified for purchase using the account associated with the card, or unqualified, meaning not eligible for purchase using the account. When validating the card as permissible for use by the end user for a contemplated purchase, the backend database may be consulted. If the desired purchase includes a commodity that is not listed as qualified, the transaction may be refused. In the alternative, if the desired purchase includes a commodity that is listed in the backend database as unqualified, the transaction may be refused. Conversely, if only qualified or "not unqualified" products are being purchased, the purchase card may be processed as any other credit or debit card, or purchasing account, as the case may be.

For example, a parent might give their child a "Made in the USA" intelligent gift card cobranded with a financial institution, e.g., MasterCard™. When the child goes to a store of his choosing and selects a product for purchase, the vendor may scan a UPC or other product code on the product and transmit that code, along with the intelligent gift card identifier, to a server associated with the centralized database. The server may check the UPC code using the centralized database and thereby determine the place of origin. Applying rules selected by the card issuer or card purchaser, the server may determine whether the goods were sufficiently made in the USA (for example, 60% U.S. made could be enough). The system may then either permit or deny the purchase based on this data.

In an embodiment of the invention, a UPC or other suitable product code for a subject to be purchased may be transmitted to a remote location for checking against a database of such codes, using any suitable transmission method. For example, the code may be read locally and transmitted via a wide area network, over a telephone line (as data or numeric tones), or wirelessly.

In an alternative embodiment, or in addition, a back end database may not be used. Instead, a list of qualifying vendors may be maintained, or vendors may be provided with an electronic certificate or security code signifying that the vendor is qualified to determine, or has in fact determined, whether or not a particular purchase meets the conditions imposed on the purchasing account. For example, a purchase card may be configured such that when the card is read by a point-of-sale terminal, the terminal displays a message such as, for example "CUSTOMER'S CARD MAY ONLY BE USED TO PURCHASE CHILDRENS" BOOKS. ENTER CODE GSSBMS05 TO CERTIFY THAT CARD IS ONLY BEING USED FOR THIS PURPOSE." In other words, according to this embodiment, a statement may be required from the merchant as to the nature of goods before validating the card as permissible for use by the end user for the contemplated purchase. Once the statement is made, such as by the merchant entering a validation code, then the purchase account may be activated for the sale. This capability may be granted to any merchant having a compatible sales terminal, or may be restricted to merchants on an approved list or certified to validate purchases as conforming to card conditions.

According to the foregoing embodiment, it may be possible to determine the eligibility of a particular purchase manually. For example, a cashier or clerk may manually confirm that a label for merchandise being purchased bears an indicator of "Made in America" status before authorizing the purchase. An electronic sales terminal may be used to remind the clerk or cashier of the required status after the purchase card is presented at the point of sale and electronically read. Also, the applicable conditions may be recorded in a digital storage medium integrated with or otherwise associated with the gift card, so that the conditions may be displayed to a sales clerk or any other party, or read by any device processing the sales transaction. In an online environment, this may be accomplished by accepting the sale on a conditional basis. At a later time, an operator for the online merchant may manually confirm that the goods comply with the card conditions and process the sale, or reject the transaction if it does not comply.

In an alternative embodiment, conditional use data may be combined with an account number for the purchase card. This may provide the advantage that existing systems can be used to transmit and use the conditional use data as single number. For example, conventional systems may be configured to accept 16-digit account numbers plus a three-digit security code for debit or credit cards. Any number of these digits may also be used to signify a condition that attaches to use of the card, specifically a restriction on what may be purchased with it. For example, if the first four digits are "9909," this may signify that the card may only be used to buy goods certified as "Made in America." A vendor receiving this code may then proceed to either manually or automatically determine compliance with the requirement for this account, and process the transaction accordingly.

For on-line purchases, on-line vendors may be supplied with a connection to a secure database used for tracking purchase account codes. When a code is entered, the database may be consulted to determine any merchandise restrictions associated with the first code. The on-line purchase may then be restricted to the category of goods indicated in the database.

The invention is not limited to restricting a purchase card to "Made in America" or any other designated class of goods. Any other desirable product quality may be indicated. For example, restrictions may indicate that only "green" (environmentally safe) certified products may be purchased; only products hand-made by craftspeople of any desired locality or ethnicity; products made by gay-owned or "gay-friendly" businesses; products of a particular type such as music, books, etc., from any vendor, or any other desired restriction. A product database may be constructed to handle a multiplicity of different product categories, restrictions, or types. Purchase cards for products of a particular type, such as give cards or credit cards, may be sponsored by an organizations interested in promoting products of that type, thereby generating revenue to defray the up-front cost of establishing and populating a product database.

The invention thereby provides a method and system by which organizations promoting sates of particular products can do so while permitting gift card holders to shop at any desired vendor. Likewise, a debit purchase card may be given as a gift while encouraging the recipient to purchase goods of a particular type. A purchase card may be used with any vendor capable of reading the debit card and connecting to the product database. Operation of an underlying banking, financial system, or electronic transaction system for the purchase accounts may otherwise be as known in the art.

A more complete understanding of the method and system for an intelligent purchase card or account will be afforded to those skilled in the art, as well as realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a schematic diagram showing aspects of a system for managing purchases made using a purchase account, according to an embodiment of the invention.

FIG. 2 is a chart showing aspects of an exemplary database that may be used to determine whether or not a particular commodity is qualified or unqualified for purchase using a purchase account, according to an embodiment of the invention.

DETAILED DESCRIPTION OF VARIOUS EMBODIMENTS

Figure 3A:
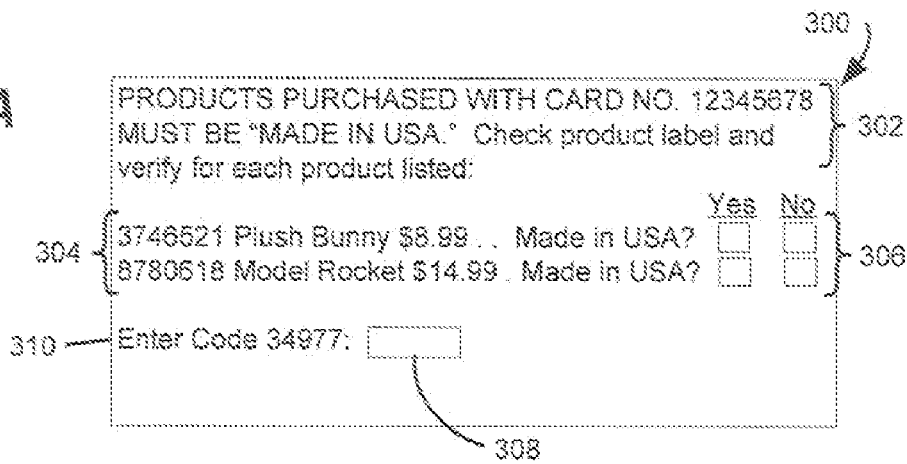
FIGS. 3A-3B are exemplary screenshots such as may be displayed at a merchant terminal during a proposed transaction using a purchase account, according to embodiments of the invention.

In the detailed description that follows, like element numerals are used to indicate like elements appearing in one or more of the figures. FIG. 1 is a schematic diagram showing aspects of a system 100 for managing purchases made using a purchase account according to an embodiment of the invention. It should be appreciated that the system may be implemented on any suitable computing platform.

System 100 may comprise a first server 102 configured for controlling use of one or more purchase accounts to comply with restrictions placed on use of the account, optionally while permitting use of the account to purchase products from multiple different vendors and service providers. It should be appreciated that server 102 may comprise any number of coordinated processors or servers, for example, a single machine, or a bank of connected machines. Server 102 may be operably associated with a database 106 or other computer memory structure holding information regarding products (i.e., goods or services) and purchase accounts, and particularly whether or particular purchase accounts are qualified to purchase specified products. Any suitable device or computer memory method may be used to store and access information regarding purchase accounts and qualification status of products. Computer 102 may be programmed using software or firmware as known in the art. Program instructions may be encoded within a digital storage medium 104, configured for causing the computer to perform a method as herein described. Storage medium 104 may comprise any suitable magnetic, optical, or electronic medium used for storing digital information for use in a computer.

Server 102 may be connected, such as via a wide area network 108, to a plurality of point-of-sale terminals 110 (one of many shown). A plurality of point-of-sale terminals for a particular merchant may be connected via a local area network to a firewall 106 or other server configured for communicating with a plurality of point-of-sale terminals and with remote sites, such as with purchase qualifier server 102. In the alternative, individual point-of-sale terminals may be configured to communicate directly with remote sites. In either case, it may be advantageous for server 102 to be configured to work with existing systems for processing purchases made using various types of purchase accounts, such as may be provided by a financial services provider servicing debit cards, credit cards, or other purchases.

In an embodiment of the invention, therefore, server 102 may communicate with a separate financial server 132. For example, financial server may query qualifying server 102 for a determination as to whether a proposed purchase is qualified. If server 102 permits the transaction, financial server 132 may process the sale in a conventional fashion. If server 102 refuses the sale, the financial server 132 may relay a message to the sales terminal 110 that the transaction has been refused. In the alternative, the sales terminal 110 may communicate directly with qualifying server 102, optionally through an intermediary server 106. If a sale is deemed qualified by server 102, the transactions details may be forwarded by any suitable one of servers 102, 106 or point-of-sale terminal 110 to financial server 132 for processing. In another alternative embodiment, the operations of financial server 132 and qualifying server 102 may be combined in a single server.

Point-of-sale terminal 110 may be configured for interacting with a human operator, such as a sales clerk, at a point of sale. As such, the terminal may comprise or be connected to a display 112, such as an electronic display screen for display of transaction details and messages. Terminal 110 may further comprise a card reader configured for reading a card 116 or other article bearing encoded account information. The account information may be encoded in any suitable fashion, for example, magnetically, optically, or electronically, as in a chip or RFID device.

Thus, card 116 may be encoded with a purchase account number 118, which may comprise a 16-digit number or any other suitable account identifier. In an embodiment of the invention, one or more digits of the account number may also serve as an identifier for a defined class of qualified commodities that may be purchased using the card. Any number of selected digits taken from any position in the account number may be combined or used to signify a particular class of goods. For example, the first four digits may be used, such as "9909" signifying "Made in USA," and so forth. Advantageously, making use of the an existing account number in this fashion may simplify the configuration of existing point-of-sale terminals for operation in a system such as system 100 for controlling use of a purchase account.

Optionally, card 116 may be likewise encoded with any suitable separate code 120 signifying a class of goods. In this embodiment, the card reader 110 and accompanying software in terminal 110 are configured to read the separate code and to handle the separate code appropriately. The use of a card or other article with an encoded account number and/or encoded class-of-goods code is optional. Other alternatives may include entering the account number and/or class code manually into the terminal, or entering this information remotely via a web page for an on-line merchant.

Point-of-sale terminal 10 may be used to process a proposed transaction for purchase of a product 114. The product may be physically present adjacent to terminal 110, or in the alternative, may be stored remotely and identified using as product identifier, as in an on-line purchasing environment. Either way, the product 114 may be associated with a product identifier 122, such as a UPC code, which may be attached to product 114 using a tag or label 126, and/or otherwise associated with the product using a merchant database or other method of association. Product 114 may also be associated with a class identifier 124, for example, a statement that the product is "Made in the USA," or any other desired class description. The class identifier may also, or in the alternative, be associated with the product 114 in an encoded form, such as a number or letter code. The class identifier is optional. If no class identifier is provided, the class of product 114 may be determined from inspection of the item itself or by association in database 106.

FIG. 2 is a chart 200 showing aspects of an exemplary database that may be used to determine whether or not a particular commodity is qualified or unqualified for purchase using a purchase account, according to an embodiment of the invention. Chart 200 is merely intended to illustrate exemplary relationships between types of identifying information in a database or other memory structure, and should not be taken as limiting useful memory structures, which should be apparent to one of ordinary skill. Chart 200 is arranged with a first column 202 indicating records comprising a plurality of identifiers 204, 206, 208, 210 and 212 (five of many shown). Each identifier is associated with one of more identifiers for classes of qualified or unqualified products. Columns 214, 216 and 218 indicate records containing identifiers for classes of qualified products. Column 220 indicates records containing identifiers for classes of unqualified products.

The first product identifier 204 is associated, for example, with codes '9909,' '7152,' and '3603.' By way of example only, these codes may indicate "Made in America," "Appropriate for Children Under 10," and "Environmentally Friendly," respectively. Thus, a purchase of the identified product may be approved for any of the foregoing restrictions. For comparison, the second product identifier 206 is approved for "Made in America" status only, while the third product identifier 208 is approved for "Appropriate for Children Under 10" only. Meanwhile, a fourth identifier 210 is disqualified in the category "Appropriate for Children Under 10," meaning that the identified product can not be purchased using an account designated for age-appropriate products only. The fifth exemplary product identifier 212 is qualified for "Made in America" products but disqualified for "Environmentally Friendly." A database as exemplified by chart 200 may be consulted anytime it is desired to determine whether a proposed transaction using a specified purchase account should be approved. Each purchase account may have at least one restriction to a class of products associated with it. Thus, a database or other memory structure as exemplified by chart 200 may be used to determine whether or not a particular product is qualified or disqualified for purchase using a specified purchase account.

Figure 3B:
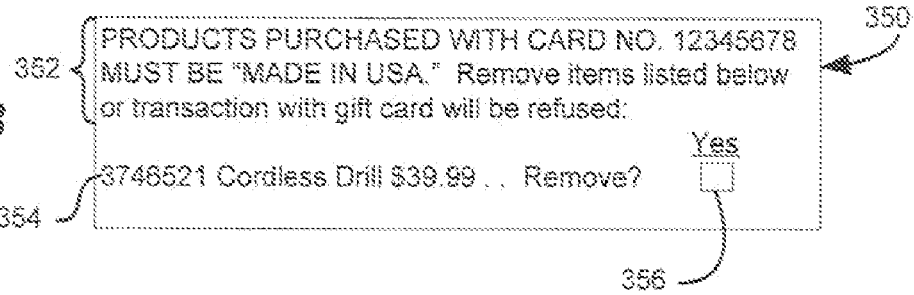

Use of a database, however, is optional. In an alternative embodiment, an authorized operator can determine whether the goods proposed for purchase are qualified. FIGS. 3A-3B are exemplary screenshots such as may be displayed at a merchant terminal during a proposed transaction using a purchase account, according to embodiments of the invention. An article may be provided, such as a credit card or debit card, that is encoded to cause the point-of-sale terminal to provide a display such as exemplified by FIGS. 3A-3B. For example, the terminal may include code for generating such displays that may be activated when a debit or credit card with an associate use restriction is read by a card reader associated with the terminal.

FIG. 3A shows an exemplary first screen 300, such as may be displayed to a sales clerk or other authorized operator for a merchant, after products to be purchased using a purchase account have been identified. In this example, the purchase account is restricted to "Made in USA" merchandise, although a similar approach may be applied for many other restrictions. Screen 300 may comprise a first message 302 configured to inform the operator of the nature of the restriction. The message may also instruct the operator concerning steps necessary to complete the transaction. In the illustrated example, the message reads "PRODUCTS PURCHASED WITH CARD NO. 12345678 MUST BE 'MADE IN USA.' Check product label and verify for each product listed." It should be apparent that many other messages may be used to convey helpful information to an operator of a sales terminal.

The first message 302 may refer to more specific information concerning the items proposed for purchase. In the illustrated example, the first message refers to an itemized list 304 of products requested for purchase. Screen 302 may provide a form whereby the operator may qualify or disqualify each product for purchase. For example, checkboxes 306 may be used to indicate whether or not each product meets the required criteria. By selecting "yes" or "no" next to the appropriate line items, the operator may indicate whether or not it is qualified for purchase. If all of the boxes are checked "yes", this may serve as an indication that the commodities proposed for purchase are included in the defined class of qualified commodities. The terminal may then generate a signal indicating the same to a qualifying or financial server. The sale then may be processed in a conventional fashion. If one of the products is indicated as not qualified, the sale may be refused, or authorized only for the qualified products.

In an embodiment of the invention, the operator may be required to enter a specific code as an indication that one or more products proposed for purchase are qualified for purchase using a specific card. For example, a message 310 may be provided on display 300, informing the operator of a code to be entered when it is determined that the proposed transaction is qualified for purchase. A form 308 may also be provided for entry of the code. When the code is entered into the terminal, this may serve as an indication that the commodities proposed for purchase are included in the defined class of qualified commodities. The terminal may then generate a signal indicating the same to a qualifying or financial server.

If one of the products is indicated as not qualified, the sale may be refused, or authorized only for the qualified products. FIG. 3B shows an exemplary $2^{nd}$ screen 350 such as may be displayed if one or more products is not qualified for sale.

Screen 350 may be displayed, for example, if an automatic database check of products proposed for purchase indicates that one product is not qualified. Such a screen may also be useful if a one or more products is manually flagged as not qualified. In either case, a message 352 may be provided informing the operator of the restriction. Optionally, the message may inform the operator that the proposed product must be removed, or the transaction will be refused. The message may include a itemized listing 354 of the unqualified product and a form 356, such a checkbox, for removal of the item. If the proposed item is removed from the transaction list, the purchase account may be approved for use with the proposed transaction, and the sale may proceed.

Figure 4:
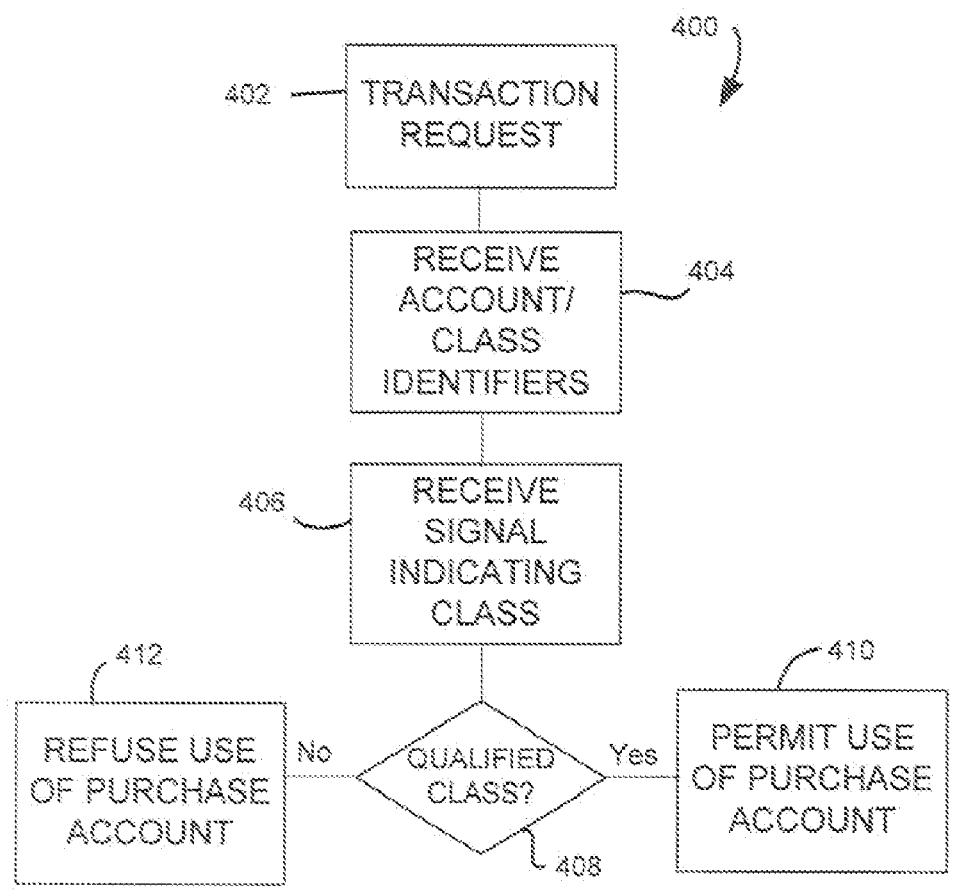
FIG. 4 is a flow diagram showing exemplary steps of a method for managing purchases made using a purchase account, according to an embodiment of the invention.

FIG. 4 is a flow diagram showing exemplary steps of a method 400 for managing purchases made using a purchase account, according to an embodiment of the invention. These steps may be performed, for example, by an authorization server 102 as shown in FIG. 1, alone or in combination with a financial services server 132, a merchant server 106, or a point-of-sale terminal 110. At step 402, a transaction request may be received, such as from a point-of-sale terminal or via an on-line sales Web site. At step 404, the authorizing server may receive and process an identifier for the purchase account, which may either comprise or be associated with one or more identifiers for a class of qualified commodities. Each class may indicate commodities that are permitted for purchase using the purchase account, or commodities restricted from purchase using the account.

At step 406, a signal may be received indicating one or more classes of commodities that are proposed for purchase. In the alternative, no such signal may be received, such as if the information is not available or the underlying commodity is in a restricted class. For example, if the applicable purchase restriction is "Must Be Made in USA," a signal may be received indicating that the product is made in the USA, is not made in the USA, or that origin of the product is unknown. The signal may be provided, for example, by an automatic lookup of the product code in a class database, or by manual entry from a sales terminal or sales screen, after a determination of eligibility made by merchant or other authorized operator.

At step 408, a determination may be made as to whether the transaction is qualified. For example, if a signal is received indicating that each commodity proposed for purchase is qualified for purchase using the account, use of the account may be permitted. For further example, if no signal is received indicating that each commodity proposed for purchase is qualified for purchase using the account, use of the account may be refused. This may occur, for example, if one or more products proposed for purchase is disqualified or has an unknown qualification status.

At step 410, the purchase may be permitted, for example by sending a signal to a merchant server or to a financial services server indicating that the transaction is permitted. Likewise, if no signal is received, the transaction may be refused as indicated at step 412.

Having thus described various embodiments of the system and method for managing purchases made using a debit or credit account, it should be apparent to those skilled in the art that certain advantages of the within system have been achieved. It should also be appreciated that various modifications, adaptations, and alternative embodiments thereof may be made within the scope and spirit of the present invention, which is not limited to the described embodiments.

What is claimed is:

1. A computer-readable storage medium having instructions stored thereon that, in response to execution by a computing device, cause the computing device to perform operations comprising:

receiving, at a point-of-sale terminal, a first identifier and a second identifier encoded on an article, the first identifier for a defined class of qualified commodities and the second identifier for a purchase account, the defined class excluding unqualified commodities;

in response to receiving the first identifier, displaying an indicator of the defined class of qualified commodities at the point-of-sale terminal and instructions for providing manual input to the point-of-sale terminal indicating whether at least one commodity presented for purchase is included in the defined class of qualified commodities;

authorizing use of the purchase account for purchase of the at least one commodity in response to manual input at the point-of-sale terminal indicating that the at least one commodity is included in the defined class of qualified commodities; and refusing use of the purchase account for purchase of the at least one commodity in response to manual input at the point-of-sale terminal indicating that the at least one commodity is not included in the defined class of qualified commodities.

2. The computer-readable storage medium of claim 1, wherein the instructions are further configured for determining whether the at least one commodity is included on a list of the qualified commodities.

3. The computer-readable storage medium of claim 1, wherein the instructions are further configured for determining whether the at least one commodity is included on a list of the unqualified commodities.

4. The computer-readable storage medium of claim 1, wherein the point-of-sale terminal is further configured to receive the article.

5. The computer-readable storage medium of claim 1, wherein the instructions are further configured for receiving the manual input from a merchant party to a proposed transaction.

6. The computer-readable storage medium of claim 1, wherein the instructions are further configured for verifying that the manual input is from an authorized merchant.

7. A system for managing purchases made using a purchasing account, the system comprising:

a point-of-sale terminal in communication with a display device; and a card reader in communication with the point-of-sale terminal, the card reader configured to read information encoded on a purchase card, wherein the point-of-sale terminal is configured:

to receive a first and a second identifier encoded on an article, the first identifier for a defined class of qualified commodities and the second identifier for a purchase account, the defined class excluding unqualified commodities;

to display, using the display device, an indicator of the defined class of qualified commodities and instructions for providing manual input to the point-of-sale terminal indicating whether at least one commodity presented for purchase is included in the defined class of qualified commodities;

to accept use of the purchase account for purchase of the at least one commodity in a proposed transaction, in response to manual input at the point-of-sale terminal indicating that the at least one commodity is included in the defined class of qualified commodities; and to refuse use of the purchase account for purchase of the at least one commodity in response to manual input at the point-of-sale terminal indicating that the at least one commodity is not included in the defined class of qualified commodities.

8. The system of claim 7, wherein the point-of-sale terminal is further configured to determine whether the at least one commodity is included on a list of the qualified commodities.

9. The system of claim 7, wherein the point-of-sale terminal is further configured to determine whether the at least one commodity is included on a list of the unqualified commodities.

10. The system of claim 7, wherein the purchase card comprises a card selected from a credit card or a debit card.

11. The system of claim 7, wherein the point-of-sale terminal is further configured to display a description of the defined class of qualified commodities.

12. The system of claim 7, wherein the point-of-sale terminal is further configured to receive the article.

13. The system of claim 7, wherein the point-of-sale terminal is further configured to automatically determine whether the at least one commodity is included in the defined class of qualified commodities.

14. The system of claim 7, wherein the point-of-sale terminal is further configured to automatically determine whether the at least one commodity is included in the defined class of qualified commodities by communicating with a server.

15. A computer-implemented method for managing purchases, the method comprising:

under control of one or more configured computer systems:

receiving, at a point-of-sale terminal, a first identifier indicating at least one defined class of qualified commodities associated with a purchase account, the defined class excluding unqualified commodities;

authorizing use of the purchase account for purchase of a commodity in a proposed transaction only in response to manual input provided at the point-of-sale terminal indicating that the commodity is included in one or more of the at least one defined class of qualified commodities; and refusing use of the purchase account for purchase of the commodity in response to manual input provided at the point-of-sale terminal indicating that the commodity is not included in one or more of the at least one defined class of qualified commodities.

16. The computer-implemented method of claim 15, further comprising receiving an article at the point-of-sale terminal encoded with the first identifier and an identifier of the purchase account.

17. The computer-implemented method of claim 15, further comprising displaying a description of the at least one defined class of qualified commodities at the point-of-sale terminal.

18. The computer-implemented method of claim 15, further comprising displaying instructions for entering the manual input at the point-of-sale terminal.

19. The computer-implemented method of claim 15, wherein the manual input comprises interaction between a human operator and the point-of-sale terminal.

20. The computer-implemented method of claim 15, further comprising verifying that the point-of-sale terminal is associated with a qualified vendor.

* * * * *

UNITED STATES PATENT AND TRADEMARK OFFICE
CERTIFICATE OF CORRECTION

PATENT NO. : 7,937,320 B2  
APPLICATION NO. : 11/559532  
DATED : May 3, 2011  
INVENTOR(S) : Shuster Page 1 of 1

It is certified that error appears in the above-identified patent and that said Letters Patent is hereby corrected as shown below:

Title page, item (57), under "Abstract", in Column 2, Line 3, delete "point of sale." and insert -- point-of-sale. --.

Column 1, line 9, delete "1005," and insert -- 2005, --.

Signed and Sealed this  
Ninth Day of August, 2011

David J. Kappos  
*Director of the United States Patent and Trademark Office*